(12) United States Patent
Olinger

(10) Patent No.: US 11,131,424 B2
(45) Date of Patent: Sep. 28, 2021

(54) AUXILIARY MOUNT

(71) Applicant: Jeffrey Overall, Costa Mesa, CA (US)

(72) Inventor: Kyle Olinger, Rancho Santa Margarita, CA (US)

(73) Assignee: Polar Pro Filters, Inc., Costa Mesa, CA (US)

( * ) Notice: Subject to any disclaimer, the term of this patent is extended or adjusted under 35 U.S.C. 154(b) by 131 days.

(21) Appl. No.: 16/544,478

(22) Filed: Aug. 19, 2019

(65) Prior Publication Data

US 2019/0368653 A1 Dec. 5, 2019

(51) Int. Cl.
*F16M 11/12* (2006.01)
*G03B 17/56* (2021.01)

(52) U.S. Cl.
CPC ......... *F16M 11/126* (2013.01); *G03B 17/561* (2013.01); *F16M 2200/022* (2013.01)

(58) Field of Classification Search
USPC ......................................... 396/428
See application file for complete search history.

(56) References Cited

U.S. PATENT DOCUMENTS

| | | | | |
|---|---|---|---|---|
| 2,823,003 A * | 2/1958 | Puggard | ................. | F16M 11/08 248/186.2 |
| 4,457,610 A | 7/1984 | Kawazoe | | |
| 4,740,804 A * | 4/1988 | Shands | ................. | G03B 15/03 248/182.1 |
| 4,763,151 A | 8/1988 | Klinger | | |
| 5,012,265 A * | 4/1991 | Nakatani | ................. | F16M 11/10 248/179.1 |
| 5,264,963 A | 11/1993 | Ueyama | | |
| 5,333,023 A * | 7/1994 | Oxford | ................. | F16M 11/041 248/222.13 |
| 5,708,533 A | 1/1998 | Hamasaki | | |
| 6,234,690 B1 * | 5/2001 | Lemieux | ............. | F16M 11/041 248/187.1 |
| 6,773,172 B1 * | 8/2004 | Johnson | ............... | F16M 11/041 248/187.1 |
| 7,273,201 B2 | 9/2007 | Lindsay | | |
| 7,380,760 B2 | 6/2008 | Dittmer | | |
| 7,753,599 B2 * | 7/2010 | Segawa | .................. | F16M 13/00 396/422 |
| 8,596,892 B2 | 12/2013 | Murrow | | |
| 8,807,850 B2 | 8/2014 | Piccoli | | |
| 9,851,624 B2 | 12/2017 | Speggiorin | | |
| 2002/0109053 A1 * | 8/2002 | Lemieux | ................ | F16M 11/16 248/187.1 |
| 2006/0177215 A1 * | 8/2006 | Johnson | ............... | G03B 17/561 396/419 |
| 2010/0237206 A1 * | 9/2010 | Barker | ................. | G03B 17/561 248/206.5 |
| 2010/0259671 A1 | 10/2010 | Lindsay | | |
| 2011/0025862 A1 | 2/2011 | Lindsay | | |
| 2014/0099093 A1 * | 4/2014 | Johnson, Sr. | ........ | G03B 17/561 396/428 |

(Continued)

*Primary Examiner* — Rodney E Fuller

(57) ABSTRACT

A mount configured to enable coupling of an auxiliary device with a base device, such as a camera. A plate is configured to couple an auxiliary device, and operatively couple with a housing. The plate is capable of movement around a panning axis when coupled with the housing. A friction controller enables adjustment of the housing to change the friction resistance to movement of the plate around the panning axis.

3 Claims, 12 Drawing Sheets

(56) References Cited

U.S. PATENT DOCUMENTS

2015/0215483 A1\* 7/2015 Farnsworth .......... F16M 13/022
              348/207.1
2017/0195536 A1\* 7/2017 Sakai ................. H04N 5/23203
2018/0299061 A1\* 10/2018 Neundorf ................ G01S 17/89
2019/0271902 A1\* 9/2019 Chan .................. F16M 11/2014

\* cited by examiner

AUXILIARY MOUNT

FIELD OF INVENTION

The present invention relates to mounting electronic devices. Specifically, it relates to mounting of auxiliary display or recording devices.

BACKGROUND OF THE INVENTION

Many cameras allow wireless or hardwire connection of auxiliary devices. Monitors or other display devices may connect with cameras or drone remote controllers to allow the viewing of recorded image data. Audio recorders may be used with cameras lacking audio capability.

Mounts have been developed to attach auxiliary devices. Some mounts allow adjustment of the auxiliary device orientation. The ability to adjust the orientation of an auxiliary device can be vital in many scenarios. For example, changing the display angle of a coupled monitor may be necessary to allow a user to view captured image data and manipulate the camera based on the data. Similarly, a microphone may be to be directed toward the source of the desired audio or away from ambient noise.

Prior art means of adjusting device orientation are rudimentary. Auxiliary devices may have to be screwed directly onto the mount. This can cause sub-optimal ergonomics during the installation process. Mounts may require the auxiliary device be coupled with the mount at the desired orientation because they do not allow adjustment while coupled. Adjustment means on mounts allowing coupled adjustment are limited or provide little control of the movement of the device. While some mounts allow adjustment of the coupled device around multiple axes, they provide no resistance to inadvertent movement while the device is in an unlocked position.

The present invention provides a means of threadably coupling an auxiliary device to a detachable plate. The plate may operatively couple with a mount.

The mount allows friction-controlled adjustment of a coupled plate—and thus the coupled auxiliary device—around at least one axis.

SUMMARY

A mount allows friction-controlled adjustment around a panning axis. A plate with device coupling means may be removably coupled with a housing. The plate and housing may be configured so or more of their respective surfaces interface. Friction may be created by these interfacing surfaces, creating friction resistance to movement around the panning axis. Adjustment of the housing may create different friction panning positions. Different amounts friction resistance to movement of a coupled plate around a panning axis exist in different friction panning positions The plate is capable of movement within the housing. The housing dimensions may be adjusted by a friction controller. The friction controller is used to adjust the friction resistance to movement of the plate around the panning axis.

The housing may be coupled with a base at a tilt axis. One or more of the respective surfaces of the housing and base may interface. Friction may be created by these interfacing surfaces, creating friction resistance to movement around the tilt axis. A tilt controller may allow adjustment of friction resistance between the housing and base. Adjustment of the tilt controller may create different friction tilt positions. The tilt controller may allow adjustment of the friction resistance to movement of the housing relative to the base.

A lock enables coupling with a base device, such as a camera, remote controller, drone, or other device with content capture capabilities. The lock may couple with the base or housing.

Figure 1A:
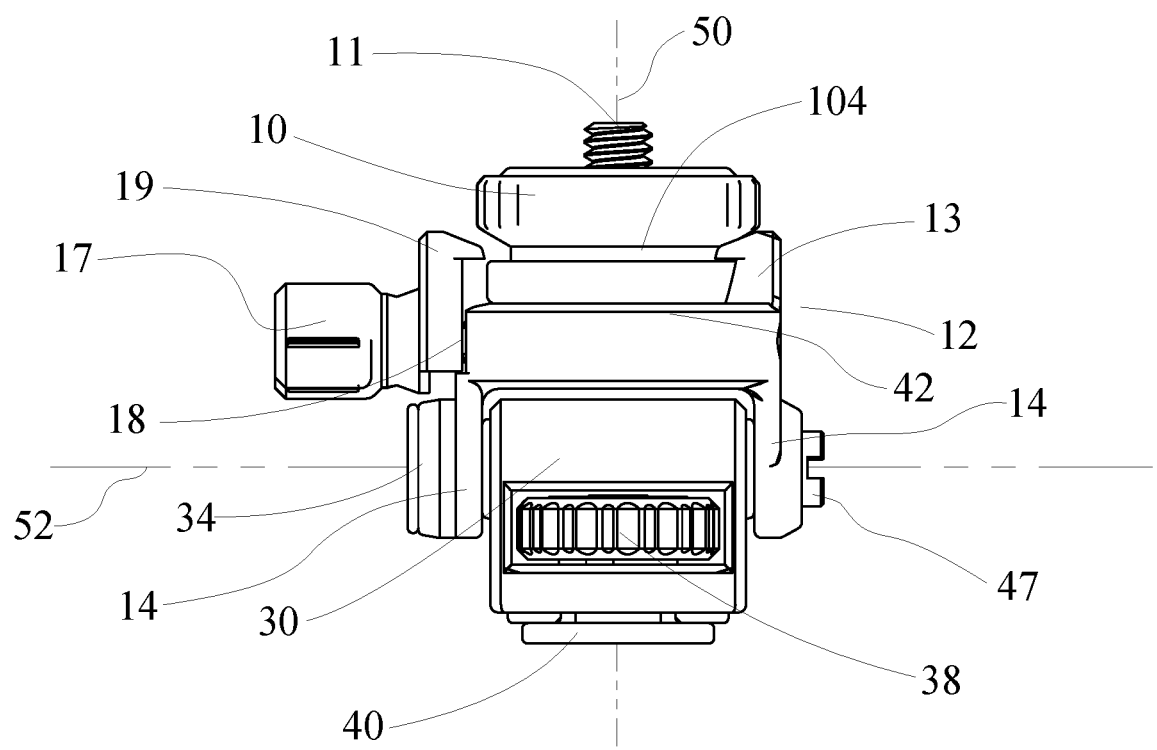
FIG. 1A is a front view of an cold shoe mount with an installed plate.
Figure 1B:
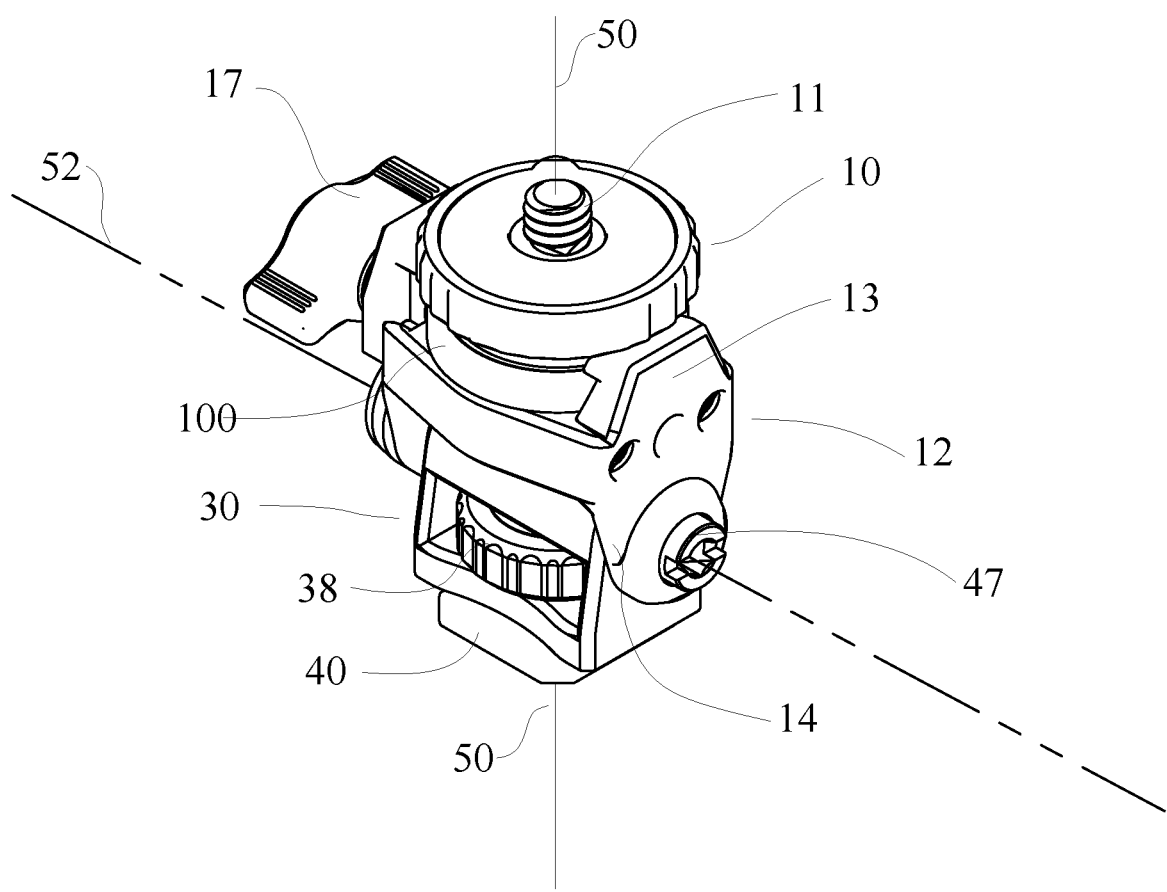
FIG. 1B is a top and right perspective view of a cold shoe mount with an installed plate.
Figure 1C:
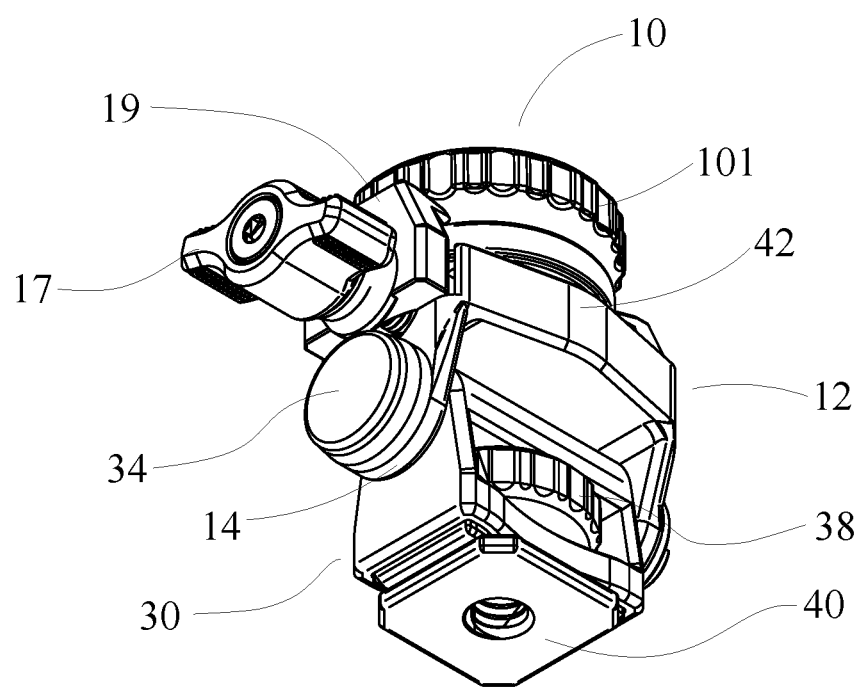
FIG. 1C is a bottom and left perspective view of a cold shoe mount with an installed plate.

DRAWING NUMERALS 10 plate
11 coupling means
12 housing
13 stationary sidewall
14 flank
15 friction controller
17 nut
18 pin
19 adjustable sidewall
20 nut
30 base
31 tilt controller
32 tilt pivot pin
33 washer
34 end cap nut
36 window
38 knob
39 stanchion
40 lock
41 lock screw
42 bed
43 cavity
44 linear torque modifier
45 base recess
46 bed width46
47 pivot cap
50 pan axis
52 tilt axis
60 stable panning position 62 resistance panning position
64 locked panning position
82 resistance tilt position
84 friction tilt position
70 camera hot shoe
100 friction ring
101 stand
102 mounting pad
104 channel
106 plate diameter
130 tooth
192 biasing peg
193 biasing device
195 peg ridge
320 pivot pin head
382 e-clip

DETAILED DESCRIPTION OF THE DRAWINGS

A housing 12 is configured to receive a plate 10. A stationary sidewall 13 extends vertically from a bed 42 aspect of the housing 12. An adjustable sidewall 19 is positioned at the opposing perimeter of the bed 42. A friction controller 15 couples the adjustable sidewall 19 with the housing 12. A pin 18 and nut 17 may form aspects of the friction controller 15. The pin 18 may operatively couple the adjustable sidewall 19 with the housing 12. The nut 17 may operatively couple with the pin 18 on the outside of the adjustable sidewall 19.

Figure 2A:
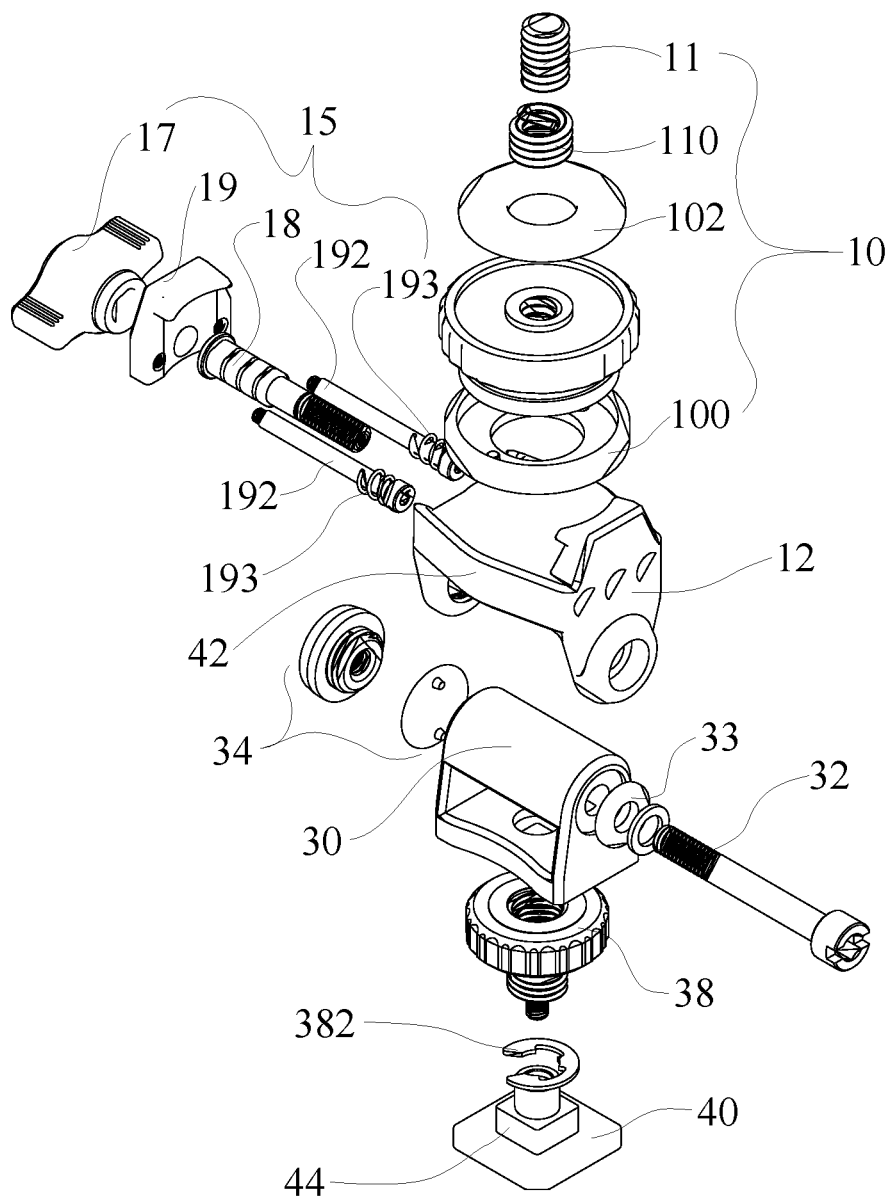
FIG. 2A is an exploded top and right perspective view of a stabilized cold shoe mount.
Figure 2B:
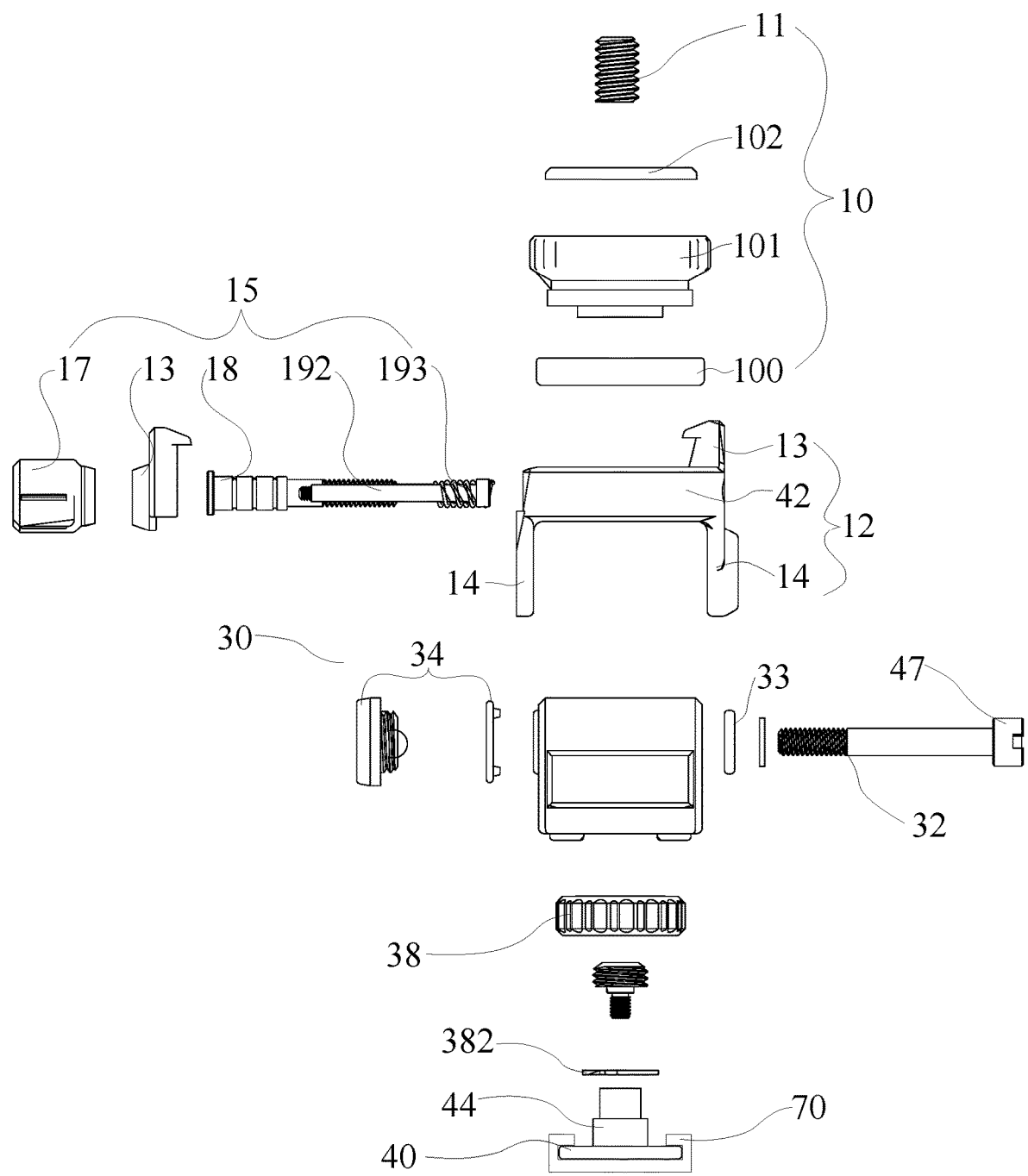
FIG. 2B is an exploded front view of a stabilized cold shoe mount.
Figure 3A:
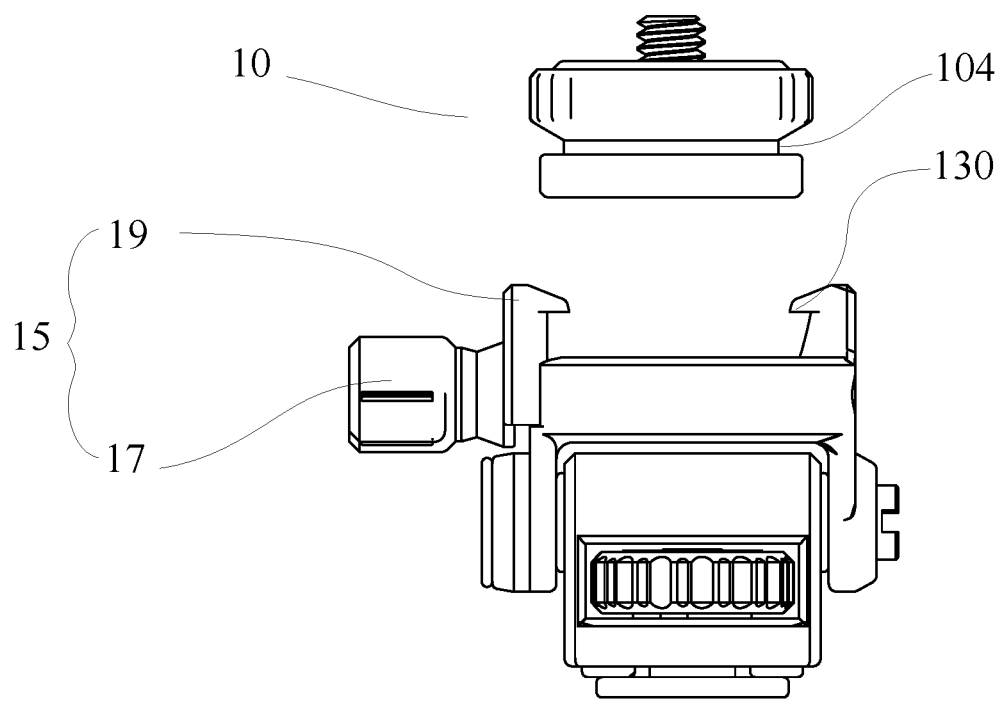
FIG. 3A is a front view of a stabilized cold shoe mount with a plate detached from a housing.
Figure 3B:
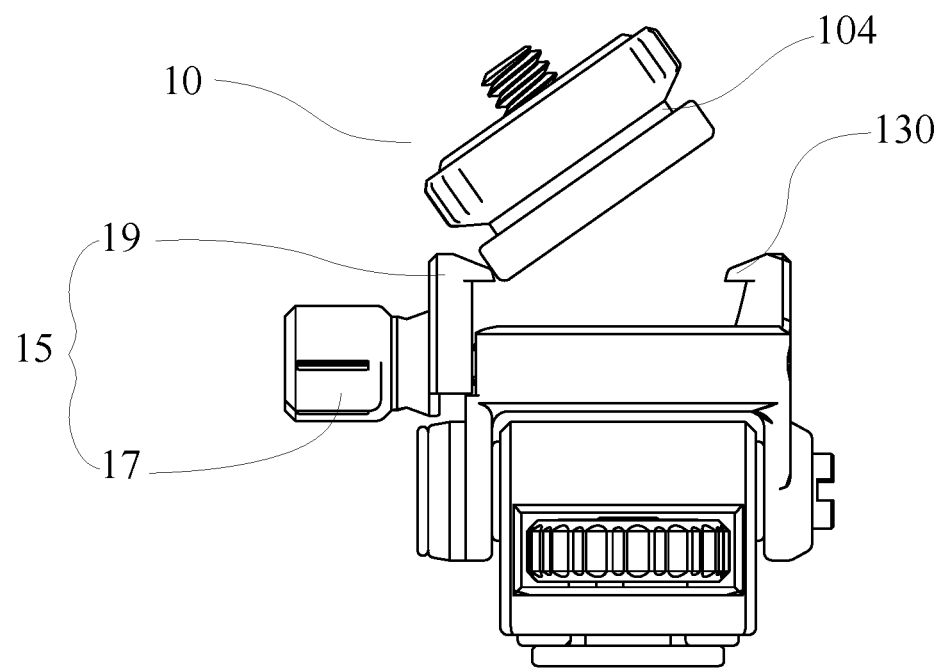
FIG. 3B is a front view of a stabilized cold shoe mount with the plate being installed into the housing.
Figure 3C:
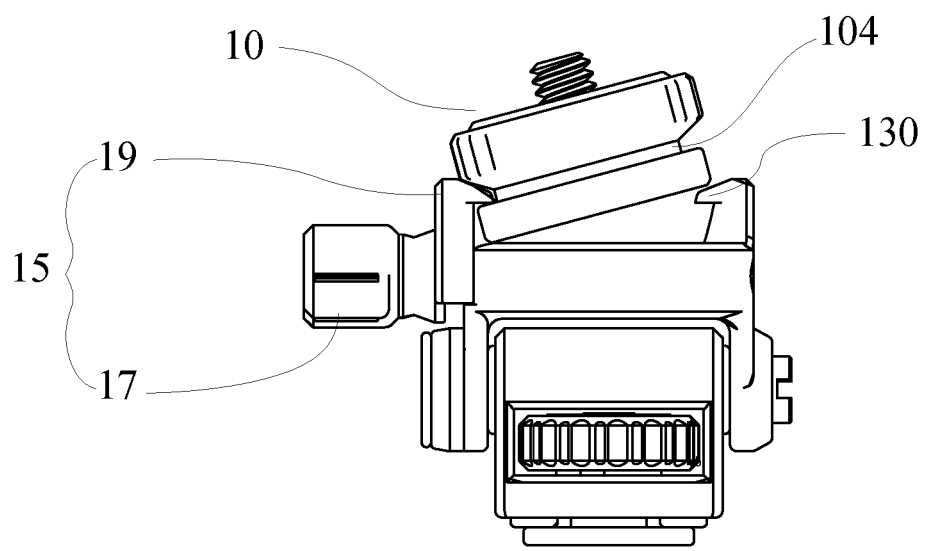
FIG. 3C is a front view of a stabilized cold shoe mount with the plate being installed into the housing.
Figure 3D:
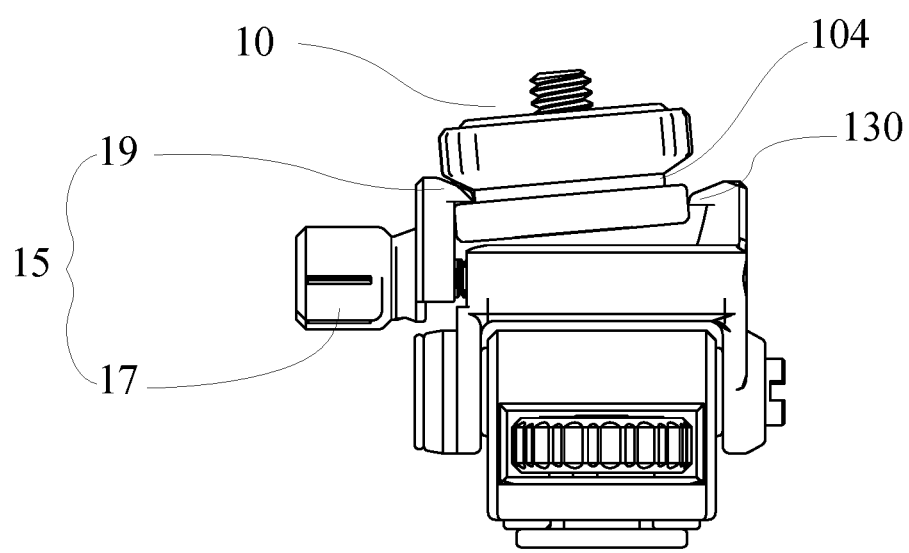
FIG. 3D is a front view of a stabilized cold shoe mount with the plate being installed into the housing.

Two flanks 14 may form a part of the housing 12 and extend downward therefrom. A base 30 may be housed between the flanks 14. A tilt pivot pin 32 (see FIGS. 2A-B) may penetrate aligned openings in the flanks 14 and base 30. A tilt lock 34 secures the tilt pivot pin 32 within the base 30 and flanks 14. A lock 40 may extend from the bottom of the base 30. A lock screw 41 may couple the lock 40 with a knob 38. The knob 38 may be housed within the base 30, the lock screw 41 extending through an opening in the base 30.

The plate 10 may be modular, i.e. detachable. The plate 10 may be roughly cylindrical, with coupling means 11 extending from the top planar surface. An auxiliary device may be coupled with the plate 10 while it is either detached from the housing 12, or coupled with the housing 12. Detached coupling enables rotation of the plate 10 relative to an auxiliary device and may be desirable when means 11 require threaded insertion. A mounting pad 102 may cover a portion of plate's 10 surface configured to abut a coupled auxiliary device. A mounting pad 102 may be made of thermoplastic elastomer or other substance with force dampening properties. Coupling means 11 may be a ¼ 20" screw, or any other means adapted to couple an auxiliary device. The housing 12 and plate 10 may be comprised of glass filled nylon, metal, plastic, or other material capable of maintaining structural integrity against the intended function.

The stationary sidewall 13, adjustable sidewall 19, and bed 42 are configured to house an installed plate 10. Two sidewall pegs 192 may couple the adjustable sidewall 19 with the housing 12 (see FIGS. 2A-2B). A biasing device 193 may be disposed within the housing 12 and bias the adjustable sidewall 19 toward the housing 12. The biasing devices 193 may be compression springs, or other device capable of mechanical energy storage.

Figure 4A:
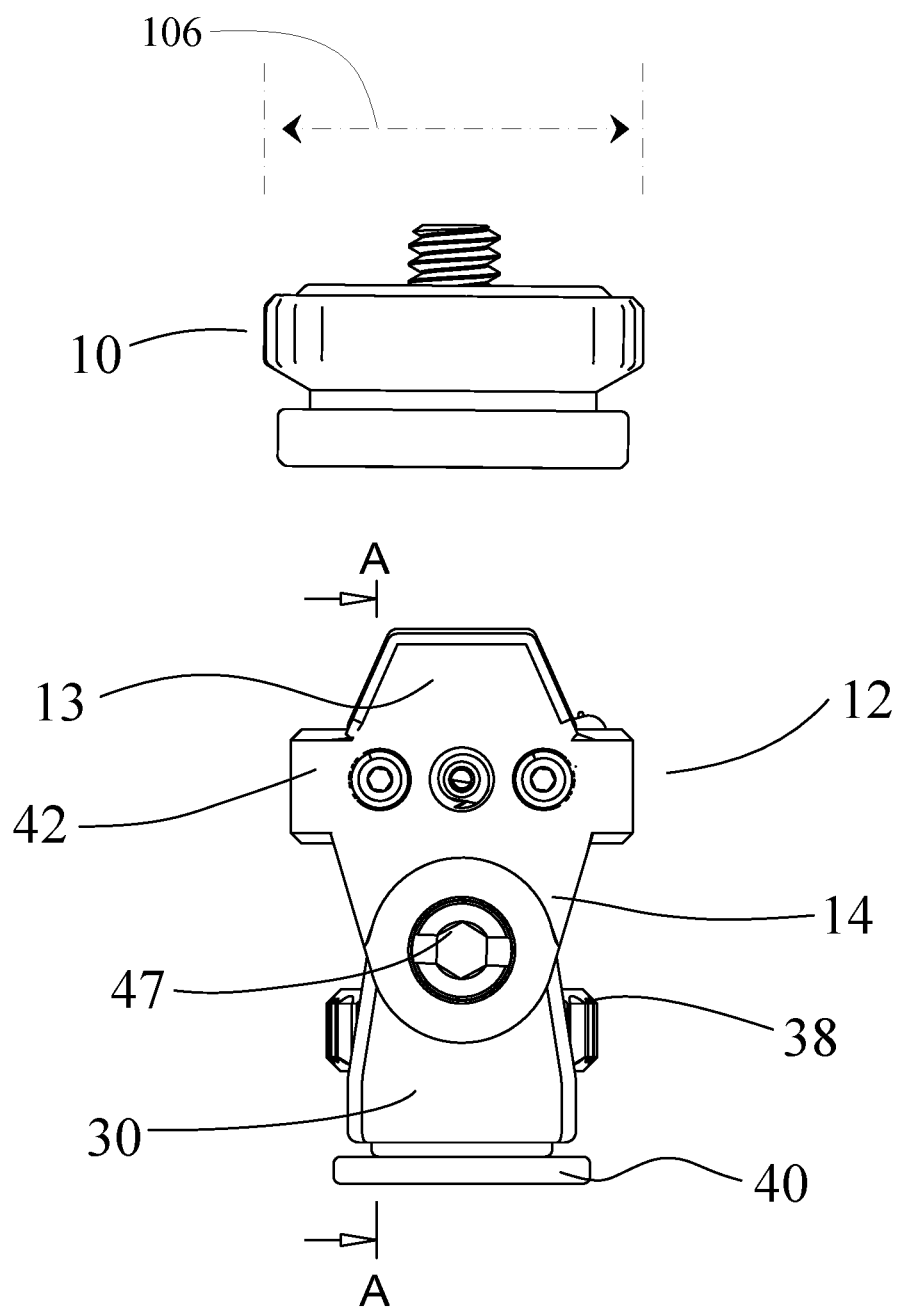
FIG. 4B is a sectional view of the cold show mount taken from FIG. 4A.
Figure 4B:
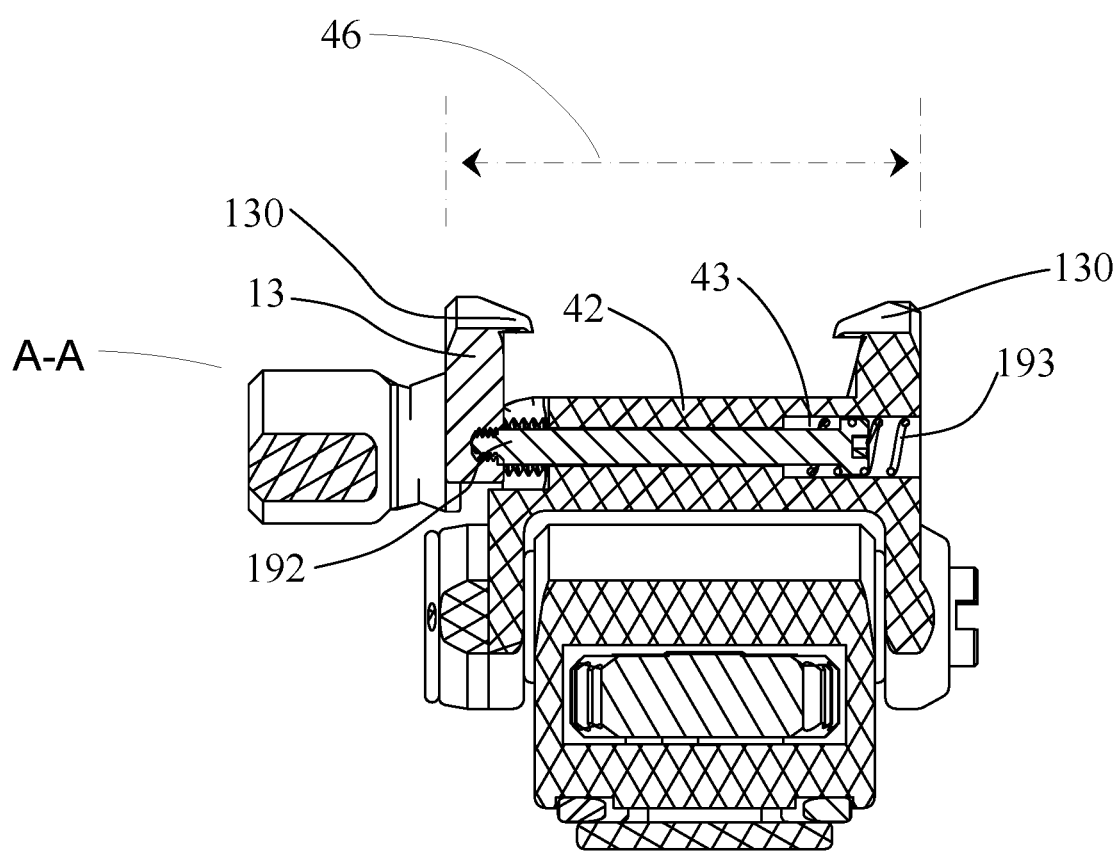
Figure 5:
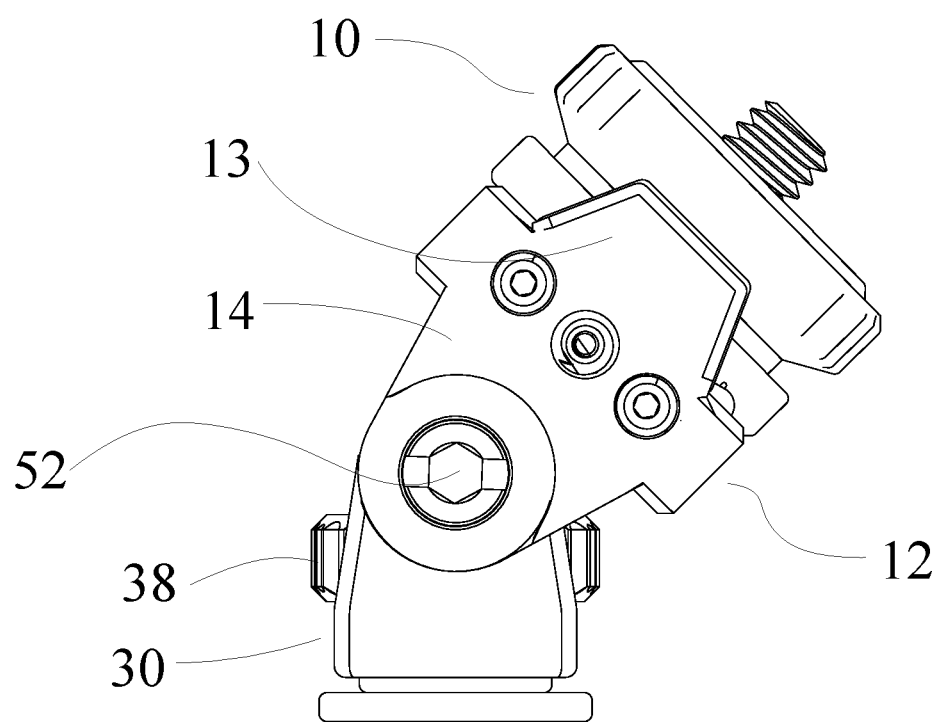
FIG. 5 is a left side view of a cold shoe mount with the plate installed and the housing rotated forward 45 degrees around a tilt axis.
Figure 6:
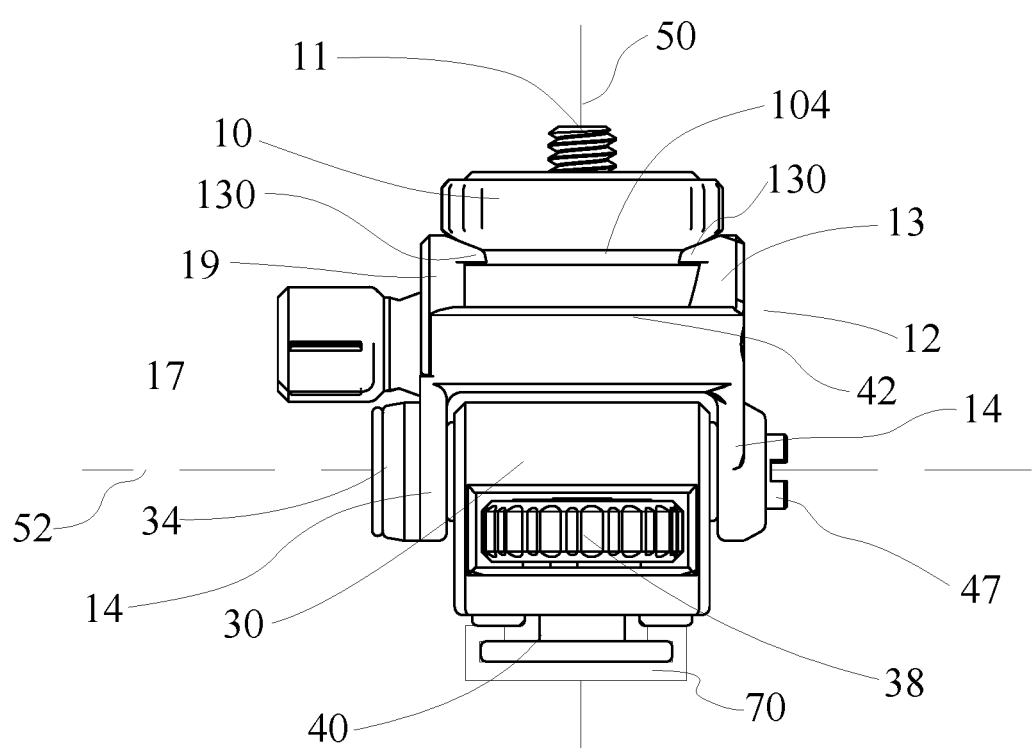
FIG. 6 is a front view of a cold shoe mount with a plate installed in a locked panning position and the lock coupled with a camera hot shoe.

The sidewall pegs 192 and pin 18 may penetrate the housing 12 bed 42 (see FIG. 4B). A cavity 43 may define the movement range of the adjustable sidewall 19. A peg ridge 195 may extend radially from the end of the sidewall peg opposing the adjustable sidewall 19. Movement of the peg ridge 195 out of the cavity 43 toward the adjustable sidewall 19 may be prevented, thus defining the movement range of the adjustable sidewall 19.

The plate 10 may be installed into the housing 12 from above (see FIGS. 3A-3D). The exemplary plate 10 is installed by angling it into the adjustable sidewall 19 and exerting sufficient force to overcome the biasing device 193 force and force the adjustable sidewall 19 away from the housing 12. The plate 10 is inserted until the bottom surface lays flush with the bed 42. Some embodiments may allow installation without altering the angle of orientation of the plate 10. Alternative embodiments may allow installation of a plate 10 from the front, back, or sides of a housing 12.

An indentation or channel 104 may penetrate the perimeter of the plate 10. A tooth 130 may extend inward from each sidewall (13, 19) towards a pan axis 50. The channel 104 may align with the teeth 130 when the plate 10 couples with the housing 12 (see FIG. 3E). The teeth 130 may be arcuate to contour an installed plate 10. An arcuate tooth 130 configuration may restrict lateral movement of a coupled plate 10. A friction ring 100 may form the bottom portion of the plate 10. The friction ring 100 may have a greater diameter than the channel 104 portion of the plate 10. A stand 101 may form the upper portion of the plate 10. The coupling means 11 may attach with the stand 101. The diameter of the stand 101 may be greater than the channel 104 diameter. An exemplary plate 10 may have a 106 of 20 mm to 30 mm, and an exemplary thickness of 6 mm to 15 mm. The channel 104 may penetrate the plate 1 mm to 3 mm. Exemplary teeth 60 may be 1 mm to 3 mm. Housing 12 dimensions may be adapted to couple a plate 10 of sufficient size to couple a target auxiliary device range(?). Exemplary housing 12 dimensions have a bed width 46 of 10 mm to 40 mm, and a sidewall (13, 19) height of 5 mm to 10 mm.

Alteration of the housing 12 dimensions by the friction controller 15 may result in a different amounts of friction resistance to movement of a coupled plate 10 around a panning axis 50. Multiple friction panning positions may be created by such alteration. A stable panning position 60, resistance panning position 62, and locked panning position 64 may comprise different panning positions.

When the plate 10 is coupled with the housing 12 the biasing devices 193 may urge the adjustable sidewall 19 into a stable panning position 60. In the stable panning position 60 both teeth extend into the channel 104, covering the top surface of friction ring 100. The teeth 60 prevent the plate 10 from detaching from the housing 12. The teeth 130 and channel 104 may prevent a coupled plate 10 from detaching from the housing 12 when coupled in any of the friction panning position (60, 62, 64) orientations. The plate 10 remains free to rotate relative to a pan axis 50.

The biasing devices 193 may be disposed within cavities 43 in the bed 42 (see FIG. 4A-B). The biasing device 193 may engage an edge of the cavity 43 and peg ridge 195, thereby urging the adjustable sidewall 19 towards the panning axis 50 when the adjustable sidewall 193 is moved away from the panning axis 52.

The nut 17 may form the operative aspect of the friction controller 15. Latches, thumb screws, or other implements may form the operative aspect of the friction controller 15. The nut 17 may operatively couple with the pin 18. The nut 17 may be positioned adjacent to the outer surface of the adjustable sidewall 19. The nut 17 may threadably couple with the pin 18 and be adjustable by rotation. The nut 17 may be rotated towards or away from the housing 12 by rotating it in opposing directions. When the nut 17 is sufficiently adjusted towards the housing 12, the adjustable sidewall 19 will engage the plate 10 and force the plate 10 into the stationary sidewall 13 thereby increasing friction resistance to movement of the plate 10 around the panning axis 50. The sidewalls (13, 19) may be arcuate to correspond to the perimeter of the plate 10 and allow even dispersion of friction resistance between the plate 10 and housing 12.

The plate 10 and housing 12 are in a resistance panning position 62 when the plate 10 is contacted by both sidewalls simultaneously (13, 19) but still capable of being manually rotated around the pan axis 50. In the resistance panning position 62 enough friction may be exerted on the plate 10 to prevent inadvertent movement, but manual, deliberate torqueing force may overcome the friction to adjust the plate 10 around the pan axis 50. The resistance panning position 62 may provide for a range of friction resistance; the nut 17 may be used to adjust the adjustable sidewall 19 relative to the pan axis 50 to enable this range of friction resistance. Greater friction resistance may be necessary to prevent inadvertent movement when a heavier device is coupled with the plate 10 to counter the gravitational torqueing force of such an object. This has the drawback of requiring greater manual force be applied to the plate 10 to overcome the friction resistance created by interaction of the plate 10 and sidewalls (13, 19). When relatively lighter devices are coupled with the plate 10 less friction force may be required to prevent unwanted movement of the plate 10.

The panning positions (60, 62, 64) will have a corresponding range of manual force necessary to rotate a plate 10 around the panning axis 50. Manual force may be measured in pound-feet (lbf·ft) or Newton Meters (N·m). An exemplary mount may be in a stable panning position 60 when 0 to 1.25 lbf·ft must be exerted to rotate the plate 10 around the panning axis 50. 1.25 to 25 lbf·ft may be the manual force range required to rotate the plate 10 around the panning axis in a resistance panning position 62. Greater than 25 lbf·ft may be required to rotate the plate 10 around the panning axis 50 in a locked panning position 64.

The friction ring 100 may be made of polyoxymethylene, such as Delrin®, or other self-lubricating plastic to allow for smooth frictional adjustment and greater precision in adjusting the plate 10 around the pan axis 50.

When the desired pan orientation of a plate 10 is achieved, the nut 17 may be tightened toward the pan axis 50 and the adjustable sidewall 19 forced into a locked panning position 64. In the locked panning position 64 the sidewalls (13, 19) exert an amount of force on the plate 10 that prevents manual adjustment of the plate 10 by a human being without abnormal hand strength. The locked panning position 64 may be desirable to provide additional stability when the auxiliary device may be subject to extensive movement, or absolute immobility of the auxiliary device relative to the base device—such as a camera, remote controller, drone, or other device with content capture capabilities—is necessary.

A tilt controller 31 may enable adjustment of the friction resistance between the base 30 and housing 12. Multiple tilt friction positions may be created by the adjustment of friction resistance. A tilt pivot pin 32, end cap nut 34, and pivot pin head 30 may comprise aspects of the tilt controller 31. A tilt pivot pin 32 may extend through both flanks 14 and the base 30. The tilt pivot pin 32 may form a tilt axis 52 around which the housing 12 may be rotated. The tilt axis 52 may extend perpendicularly to the panning axis 50. An end cap nut 34 may enable adjustment of the friction resistance to movement around the tilt axis 52. The tilt pivot pin 32 may threadably couple with the end cap nut 34. Insertion of the tilt pivot pin 32 into the end cap nut 34 may increase the pressure exerted by the end cap nut 34 on the adjacent flank 34 and base 30 surfaces. Friction resistance is created by interaction of the flank 34 and base 30. A pivot pin head 320 may improve the ability to apply torque and thread the tilt pivot pin 32 further into the end cap nut 34. A washer 33 may be disposed around the pivot pin 30 and sandwiched between the pivot pin head 320 and base 30. The washer 33 may be comprised of rubber, plastic, or other material. The washer 33 may reduce gradual damage to the base 30 pivot pin 32. The washer 33 may also improve the incremental adjustment of friction resistance and reduce vibration and stress between the pivot pin 32 and base 30.

A resistance tilt position 82 and locked tilt position 84 may comprise friction tilt positions. The flanks 14 and base 30 may be oriented in the resistance tilt position 82. The flanks 14 may be constructed of glass filled nylon, metal or other material providing flexion and yield strength. In the resistance tilt position 82 both flanks 14 engage the base 30 and provide some friction resistance to movement of the housing 12 around the tilt axis 12.

A locked tilt position 84 is achieved when sufficient insertion of the tilt pivot pin 32 into the end cap nut 34 by tightening or other method increases the force exerted by a pivot cap 47 and end cap nut 34 on the outside of the flanks 14, forcing the flanks 14 inward towards the base 30.

Loosening or movement of the pivot cap 47 away from the end cap nut 34 may disengage one or both of the flanks 14 from the base, thereby changing from a resistance tilt position 82 to a stable tilt position 80. The stable tilt position 80 may allow quick rotation of the housing 12 and may be desirable when the user is able to use both hands to manipulate the base 30 and housing 12.

The friction tilt positions (82, 84) will have a corresponding range of manual force necessary to rotate the housing 12 or base 30 around the tilt axis 52. Manual force may be measured in pound-feet (lbf·ft) or Newton Meters (N·m). An exemplary mount may be in a stable panning position 60 when 125 to 25 lbf·ft must be exerted to rotate the housing 12 around the tilt axis 52. Greater than 25 lbf·ft may be required to rotate the housing 12 around the tilt axis 52 in a locked tilt position 84. A stable tilt position 80, in which 0 to 1.25 lbf·ft manual force is required to rotate the housing 12 may be created by further loosening the end cap nut 34 away from the base 30.

A knob 38 may be disposed within the base 30. The knob 38 may be accessible to manual torqueing force at one or multiple points. The knob 38 may be housed within the base 30 and exposed on opposing sides thereof. A lock screw 41 may extend from the knob 38 and through an opening in the base 30. The lock screw 41 may couple with a lock 40. The lock 40 may be a polyhedron and configured to be received by and couple with a camera hot shoe 70 mounting point. Rotation of the knob 38 may result in movement of lock 40 relative to the base. Alternative locking means may allow threaded insertion, snap-hooking, clamping, magnetic, or other means adapted to couple with a base device.

When the lock 40 is installed into a hot shoe 70 it may be tightened by rotating the knob 38 in the direction resulting in movement of the lock 40 towards the base 30. The top of the hot shoe 70 is sandwiched between the base 30 and the lock 40. A linear torque modifier 44 may be operatively coupled with the lock 40 and lock screw 41. A base recess 45 in the bottom surface of the base 30 may be configured to receive the linear torque modifier 44. The linear torque modifier 44 may be capable of rotation relative to both the lock 40 and locking screw 41. Rotation of the lock screw 41 may press the linear torque modifier 44 into the base recess 45. The structure of the base recess 45 may counteract the torqueing force of the lock screw 41 and prevent the linear torque modifier 44 from rotating. The rotation force is thereby converted into linear movement of the lock 40 towards or away from the base 30, depending on the rotation direction of the knob 38. Prevention of lock 40 rotation may be desired when the base device coupling means requires constant alignment while the lock 40 is moved towards and away from the base device, as with a camera hot shoe 70.

An e-clip 382 may be disposed around the lock screw 41, and between the knob 38 and base 30. The e-clip 382 may prevent the lock screw 41 from disconnecting from the knob 38 by opposing downward movement of the lock screw 41 out of the knob 38.

The ring 100 may interface with the bed 42 and sidewalls (13, 19). The friction ring 100 may be comprised of polyoxymethylene, such as self-lubricating Delrin® or other plastic or material with wear resistance or dimensional stability. A dry lubricant material may enhance panning ability of the plate 10.

The foregoing discussion discloses and describes merely exemplary embodiments and measurements. As will be understood by those familiar with the art, the disclosed subject matter may be embodied in other specific forms without departing from the essence or characteristics thereof. Accordingly, the foregoing disclosure is intended to be illustrative, but not limiting, of the scope of the invention, which is set forth in the claims.

I claim:

1. A mounting device, comprising:
   a. a plate, said plate comprising auxiliary device coupling means;
   b. the plate further comprising a friction ring comprised of self-lubricating plastic;
   c. a housing, the housing comprising a stationary sidewall and an adjustable sidewall;
   d. the housing further comprising a bed, the bed configured to support a relatively flat surface of said plate opposing said auxiliary device coupling means
   e. the housing configured to operatively couple said plate;
   f. a friction controller as means of adjusting dimensions of said housing, whereby a stable panning position, a resistance panning, and a locked panning position may be created;
   g. a base, the base comprising a tilt controller;
   h. the tilt controller as means of coupling the housing and the base and thereby creating a tilt axis;
   i. the tilt controller as means of adjusting the friction resistance between said housing and said base, whereby a plurality of friction tilt positions may be created.

2. The mounting system in claim 1, wherein a lock couples with the base.

3. A mounting device, comprising:
   a. a housing, said housing comprising a friction controller, said housing further comprising at least one sidewall and a bed, said at least one sidewall and said bed defining dimensions of said housing;
   b. a plate, said plate comprising auxiliary device coupling means, said plate being configured to couple with said housing;
   c. the at least one sidewall comprising an arcuate surface configured to contour at least one surface of a plate;
   d. the friction controller as means of adjusting said at least one sidewall, whereby dimensions of said housing may be adjusted;
   e. the plate being configured to couple with said housing;
   f. a panning axis extending substantially perpendicular from said bed;
   g. the housing comprising a biasing device, the biasing device exerting force on the at least one sidewall towards the panning axis;
   h. the friction controller being configured adjust the sidewall to a plurality of friction panning positions;
   i. at least one of said plurality of friction panning position configured to allow manual rotation of said plate relative to said panning axis when coupled with said housing;
   j. at least one of said plurality of friction panning positions comprising a locked panning position.

* * * * *